United States Patent
Lee et al.

(10) Patent No.: US 7,842,260 B2
(45) Date of Patent: Nov. 30, 2010

(54) REACTION VESSEL AND REACTION DEVICE

(75) Inventors: Sung-chul Lee, Suwon-si (KR); Ju-yong Kim, Suwon-si (KR); Yong-kul Lee, Suwon-si (KR); Man-seok Han, Suwon-si (KR); Jun-sic Kim, Suwon-si (KR); Chan-ho Lee, Suwon-si (KR); Jin-goo Ahn, Suwon-si (KR)

(73) Assignee: Samsung SDI Co. Ltd., Yongin-si (KR)

( * ) Notice: Subject to any disclaimer, the term of this patent is extended or adjusted under 35 U.S.C. 154(b) by 348 days.

(21) Appl. No.: 11/877,562

(22) Filed: Oct. 23, 2007

(65) Prior Publication Data
US 2008/0241019 A1  Oct. 2, 2008

(30) Foreign Application Priority Data
Mar. 29, 2007  (KR)  ............ 10-2007-0030974

(51) Int. Cl.
*B01J 8/02* (2006.01)
*C01B 3/02* (2006.01)

(52) U.S. Cl. .............. 422/222; 422/211; 422/311; 422/180; 422/188; 422/198; 422/199; 48/61; 48/127.9; 48/198.7; 423/648.1; 502/326; 502/329; 502/331; 502/333

(58) Field of Classification Search .......... 48/61, 48/127.9, 198.7; 423/648.1; 502/329, 326, 502/331, 333; 422/180, 189, 211, 198, 311, 422/199, 222
See application file for complete search history.

(56) References Cited

U.S. PATENT DOCUMENTS

| | | | |
|---|---|---|---|
| 3,425,803 A * | 2/1969 | Romeo, Sr. ............ | 423/392 |
| 4,396,480 A | 8/1983 | Hegedus et al. | |
| 4,647,435 A * | 3/1987 | Nonnenmann ........... | 422/180 |
| 4,909,808 A * | 3/1990 | Voecks ................. | 48/94 |

(Continued)

FOREIGN PATENT DOCUMENTS

CN  1675455 A  9/2005

(Continued)

OTHER PUBLICATIONS

Office Action corresponding Chinese Pat No. 200810002353.X, Apr. 3, 2009.

(Continued)

*Primary Examiner*—Walter D Griffin
*Assistant Examiner*—Huy-Tram Nguyen
(74) *Attorney, Agent, or Firm*—Knobbe, Martens, Olson & Bear, LLP (57) ABSTRACT

Provided is a reaction vessel for a fuel cell, and more particularly to a reaction vessel exhibiting improved thermal efficiency, and a reaction device for a steam reforming reaction for a fuel cell. The reaction device includes a cylindrical reaction catalyst chamber on which a target reaction catalyst for a predetermined target reaction is disposed; and a tubular oxidation catalyst chamber surrounding the reaction catalyst chamber, comprising an oxidation reaction catalyst therein. The reaction device according features an increased contact area between catalyst and gas, and rapidly heating of the gas in contact with the catalyst to a desired reaction temperature.

10 Claims, 5 Drawing Sheets

U.S. PATENT DOCUMENTS

| | | | | |
|---|---|---|---|---|
| 5,108,716 | A * | 4/1992 | Nishizawa | 422/171 |
| 5,752,995 | A * | 5/1998 | Kang | 48/198.7 |
| 5,904,913 | A * | 5/1999 | Bohm et al. | 423/648.1 |
| 7,030,059 | B2 * | 4/2006 | Tanabe | 502/439 |
| 2001/0016188 | A1 * | 8/2001 | Haga et al. | 423/648.1 |
| 2001/0053467 | A1 * | 12/2001 | Kaneko et al. | 429/19 |
| 2004/0144029 | A1 * | 7/2004 | Miura et al. | 48/127.9 |
| 2005/0005521 | A1 * | 1/2005 | Kaye et al. | 48/215 |
| 2005/0170957 | A1 * | 8/2005 | Maus et al. | 502/439 |
| 2005/0217180 | A1 | 10/2005 | Reinke et al. | |
| 2006/0008399 | A1 * | 1/2006 | Feinstein | 422/222 |
| 2007/0224094 | A1 * | 9/2007 | Park et al. | 422/188 |

FOREIGN PATENT DOCUMENTS

| | | |
|---|---|---|
| CN | 1845784 A | 10/2006 |
| DE | 3347086 | 7/1985 |
| DE | 10007766 | 8/2001 |
| EP | 0151229 | 8/1985 |
| EP | 1 394 103 | 3/2004 |
| JP | 11-043305 | 2/1999 |
| JP | 2001-023671 | 1/2001 |
| JP | 2001-2594726 | 9/2001 |
| JP | 2004-193013 | 8/2004 |
| JP | 2006-093091 | 4/2006 |
| KR | 10 2005 0095953 | 10/2005 |
| KR | 1020060078943 | 5/2006 |
| WO | WO 98/52868 | 11/1998 |
| WO | WO 03/035254 | 5/2003 |
| WO | WO 2004/022937 | 3/2004 |
| WO | WO 2005/004256 | 1/2005 |

OTHER PUBLICATIONS

Search Report of European Application No. 08250133.9, dated Apr. 8, 2008.

Office action dated Aug. 26, 2008 for corresponding KR 10-2007-0030974.

Extended European Search Report for Corresponding EP Application No. 08250133.9-2119/1977822, Nov. 20, 2008.

* cited by examiner

REACTION VESSEL AND REACTION DEVICE

CROSS-REFERENCE TO RELATED APPLICATIONS

This application claims the benefit of Korean Patent Application No. 10-2007-0030974, filed on Mar. 29, 2007 in the Korean Intellectual Property Office, the disclosure of which is incorporated herein by reference.

BACKGROUND

1. Technical Field

The present disclosure relates to a reaction vessel for a fuel cell, and more particularly to a reaction vessel with improved thermal efficiency, and a reaction device for a steam reforming reaction.

2. Discussion of Related Art

A fuel cell is a power generation system for generating electricity by electrochemically reacting hydrogen with oxygen. Fuel cells are divided into phosphate fuel cells, molten carbonate fuel cells, solid oxide fuel cells, polymer-electrolyte-membrane fuel cells, alkaline fuel cells, etc., depending on the type of electrolyte used. Each of these types of fuel cell operates on the same basic principle, but the type of fuel, operating temperature, catalyst, electrolyte, etc. are different. Among these types of fuel cells, the polymer electrolyte membrane fuel cell (PEMFC) exhibits excellent output characteristics, a low operating temperatures, and rapid start-up and response times, compared to the other types of fuel cells, and are widely used in distributed electric power sources that can be stationary, for example, for houses or public facilities, or mobile, for example, for portable electronic equipment or automobiles.

Hydrogen has best reactivity as the fuel for the electrochemical oxidation reaction that occurs at the anode electrode of a fuel cell, where it reacts with oxygen to generate water. Furthermore, hydrogen does not generate any air pollutants. However, pure hydrogen gas is typically generated by reforming other compounds because does not a naturally occur in its elemental form on earth. For example, hydrogen may be obtained from a hydrocarbon-based fuel such as gasoline, diesel, methanol, ethanol, natural gas, etc. through a reforming. Also, hydrogen may also be easily obtained from fuel sources such as commercially available butane cans. Accordingly, if a butane can is used as a fuel source for a fuel cell, the fuel may be conveniently supplied using the internal pressure of the butane can.

Some fuel cells have a reformer that generates hydrogen from a hydrocarbon-based fuel. The inner part of the reformer may be divided into a reforming reaction unit, a water-gas shift unit, and a preferential oxidation unit to further enhance the reforming efficiency. The reforming reaction unit may be further divided into a steam reforming reaction unit and an autothermal reforming reaction unit.

Each of the reaction units in the reformer has a different reaction temperature range according to the reaction catalyst used therein. For example, the reaction temperature range of the steam reforming (SR) reaction varies according to the feedstock. Here, if the feedstock is a hydrocarbon-based fuel such as butane, the reaction temperature of the steam reforming reaction ranges from about 600° C. to about 900° C., but if the feedstock is methanol, the reaction temperature of the steam reforming reaction ranges from about 250° C. to about 400° C. And, the reaction temperature range of the water gas shift (WGS) reaction, which is one of the processes for removing carbon monoxide, ranges from about 200° C. to about 350° C., while the reaction temperature range of a preferential CO oxidation (PROX) reaction ranges from about 100° C. to about 250° C. As described above, the reaction temperature range of each of the reaction units in the reformer goes down in the following order: the reforming reaction unit, the water gas shift unit, and the preferential oxidation unit.

In order to provide the desired reaction temperature range for each of the units, a heat source, for example, an electric heater such as nichrome wire or a device that burns a hydrocarbon fuel, optionally, using a catalyst.

The steam reforming reaction unit converts steam and a hydrocarbon fuel into hydrogen molecules and carbon dioxide at high temperatures, as shown in Scheme 1. Butane is used as the hydrocarbon in the following examples. The reaction illustrated in Scheme 1 is an endothermic reaction because high-energy state hydrogen molecules are generated from low energy state water molecules. A large amount of hydrogen is generated in the endothermic reaction, however.

Scheme 1

In the autothermal reforming reaction unit, a hydrocarbon reacts with oxygen from the air at the steam reforming reaction temperature to provide hydrogen molecules and carbon dioxide as shown in Scheme 2. The reaction is exothermic because the carbon atoms are oxidized and none of the hydrogen atoms in the product come from water molecules as in the steam reforming reaction.

Scheme 2

In a steam reforming reaction or an autothermal reforming reaction, carbon dioxide should be theoretically generated, but in practice, a large amount of carbon monoxide is actually generated due to incomplete reactions. As one of the devices for reducing carbon monoxide, the water-gas shift unit reacts carbon monoxide with steam to completely oxidize the carbon monoxide to carbon dioxide, and simultaneously generate hydrogen molecules are from the hydrogen atoms of the water molecules. The water-gas shift reaction is shown in Scheme 3.

Scheme 3

As another one of the devices for reducing carbon monoxide, the preferential oxidation unit oxidizes carbon monoxide to carbon dioxide by reacting the carbon monoxide with oxygen from the air.

Scheme 4

The reforming efficiency of the reformer is large part of the total efficiency of the fuel cell system. To improve the efficiency of the reformer, the components in the reformer, such as the reforming reaction unit, the water gas shift unit, and the preferential oxidation unit, in which the chemical reactions occur, should be rapidly heated their respective reaction temperatures. Efficiency can also be improved when each unit in the reformer has a high surface area structure on which the reaction catalyst disposed and which contacts the reactant gas phase the desired temperature.

It is also desirable to increase the actual contact area between the catalyst and the gas using a reactor with a structure that promotes mixing of the gas.

Furthermore, the heat energy used in the reforming process is discharged out of the reformer, which wastes the heat energy, and therefore, reduces the overall electric generation efficiency of the system.

SUMMARY OF THE INVENTION

Accordingly, embodiments disclosed herein solve one or more of the drawbacks discussed above, and therefore an object of this disclosure is to provide a reaction vessel that exhibits increased contact area between the catalyst and the gas, and rapid heating of the gas and catalyst to a desired reaction temperature, as well as a reaction device having the reaction vessel.

Also, another object is to provide a reaction vessel having a mixing structure capable of increasing a contact frequency between a catalyst with the gas flowing through the reaction vessel, and a reaction device having the reaction vessel.

Also, still another object is to provide a reaction device capable of increasing a catalyst reaction rate, and simultaneously minimizing a waste of heat energy.

One embodiment provides a reaction vessel having a cylindrical shape and being able to generate a predetermined target reaction on an internal gas, the reaction vessel including a metal monolithic reactor comprising cells penetrated in a longitudinal direction of the cylindrical shape and having an opening ratio of about 40% to about 95% in a cross-sectional surface orthogonal to a longitudinal direction of the cylindrical shape; and a catalyst material attached to an inner wall of each cell. Also, the metal monolithic reactor preferably comprises of cells having a cell density of 200 to 1,500 cpi.

Meanwhile, in order to increase a contact frequency of internal gas with the catalyst, the metal monolithic reactor is formed of several stacked monolithic sheets, each of which comprises a pleated substrate having a plurality of uniform pleats formed therein and forming an internal barrier of the metal monolithic reactor; and a side substrate attached to one side or both sides of the pleated substrate, and the pleated substrate or the side substrate has a plurality of perforations.

Another embodiment provides a reaction device including a reaction catalyst chamber comprising a target reaction catalyst material for a predetermined target reaction attached to a metal monolithic reactor formed as a cylindrical core; and an oxidation catalyst chamber arranged in a tube surrounding the reaction catalyst chamber, and in which an oxidation reaction of a combustible fuel occurs because of an oxidation catalyst material therein.

Preferably, the reaction device is a reforming reaction device for reforming a hydrocarbon fuel into hydrogen gas, and the reaction device further includes a fuel preheating unit in a tube shape surrounding the oxidation catalyst chamber, and pre-heating a fuel, supplied from outside the device, with heat discharged from the oxidation catalyst chamber; and a water preheating unit in a tube shape surrounding the oxidation catalyst chamber, and pre-heating water, supplied from outside the device, with heat discharged from the oxidation catalyst chamber.

Some embodiments provide a cylindrical reaction vessel for performing a target reaction on a gas therein, the reaction vessel comprising: a metal monolithic reactor comprising a plurality of longitudinal cells with an opening ratio of from about 40% to about 95%, as measured in a cross-sectional surface orthogonal to the longitudinal direction; and a catalyst disposed on an inner wall of each cell.

In some embodiments, the metal monolithic reactor comprises at least one coiled monolithic sheet, each of which comprises a pleated substrate having a plurality of uniform pleats formed therein and form internal barriers of the metal monolithic reactor; and at least one side substrate secured to one or both sides of the pleated substrate, and wherein at least one of the pleated substrate and the at least one side substrate comprises a plurality perforations formed therein.

In some embodiments, the pleated substrate comprises a plurality of holes formed therein. In some embodiments, the pleated substrate comprises a plurality of slots formed therein.

In some embodiments, a cell density of the metal monolithic reactor is from about 200 cpi to about 1,500 cpi.

In some embodiments, the target reaction is a steam reforming reaction, and the catalyst comprises at least one of $Ni/Al_2O_3$, $Ru/ZrO_2$, $Ru/Al_2O_3$, and $Ru/CeO_2$—$Al_2O_3$. In some embodiments, the target reaction is an exothermic oxidation reaction, and the catalyst comprises at least one of $PdAl_2O_3$, NiO, CuO, $CeO_2$, $Al_2O_3$, Rh, Pd, and Pt. In some embodiments, the target reaction is a water gas shift reaction, and the catalyst comprises at least one of Cu, Zn, Fe, Cr, $Cr_2O_3/Fe_3O_4$, $Pt/CeO_2$, and $Cu/ZnO/Al_2O_3$. In some embodiments, the target reaction is a selective oxidation reaction, and the catalyst comprises at least one of Ru, Rh, $Pt/Al_2O_3$, $TiO_2$, $ZrO_2$, and $Au/Fe_2O_3$.

Some embodiments provide a reaction device, comprising: a cylindrical reaction catalyst chamber comprising a metal monolithic reactor on which is disposed a target reaction catalyst for a target reaction; and a tubular oxidation catalyst chamber surrounding the reaction catalyst chamber, wherein the oxidation catalyst chamber comprises an oxidation reaction catalyst for the oxidation of a combustible fuel therein.

In some embodiments, the reaction device is configured for reforming a hydrocarbon fuel with hydrogen gas, and the reaction device further comprises a fuel preheating unit comprising a tube disposed around the oxidation catalyst chamber, configured for pre-heating a fuel with a heat from the oxidation catalyst chamber. Some embodiments further comprise a water preheating unit comprising a tube shape disposed around the oxidation fuel preheating unit, configured for pre-heating water with heat from the oxidation catalyst chamber.

Some embodiments further comprise an electric heater disposed in the oxidation catalyst chamber, configured for heating the oxidation catalyst chamber to a suitable temperature to induce an oxidation reaction.

In some embodiments, the oxidation catalyst chamber comprises a metal monolithic reactor with the oxidation reaction catalyst disposed thereon. In some embodiments, the oxidation catalyst chamber comprises a ceramic monolithic reactor with the oxidation reaction catalyst disposed thereon. In some embodiments, the oxidation reaction catalyst comprises at least one of $PdAl_2O_3$, NiO, CuO, $CeO_2$, $Al_2O_3$, Rh, Pd, and Pt.

In some embodiments, the target reaction is a steam reforming reaction, and the target reaction catalyst comprises at least one of $Ni/Al_2O_3$, $Ru/ZrO_2$, $Ru/Al_2O_3$, and $Ru/CeO_2$—$Al_2O_3$. In some embodiments, the target reaction is a water gas shift reaction, and the target reaction catalyst is at least one of Cu, Zn, Fe, Cr, $Cr_2O_3/Fe_3O_4$, $Pt/CeO_2$, and $Cu/ZnO/Al_2O_3$. In some embodiments, the target reaction is a selective oxidation reaction, and the target reaction catalyst material comprises at least one of Ru, Rh, $Pt/Al_2O_3$, $TiO_2$, $ZrO_2$, and $Au/Fe_2O_3$ as a major component.

BRIEF DESCRIPTION OF THE DRAWINGS

These and/or other aspects and advantages will become apparent and more readily appreciated from the following description of certain preferred embodiments, taken in conjunction with the accompanying drawings.

DETAILED DESCRIPTION OF CERTAIN EXEMPLARY EMBODIMENTS

Hereinafter, certain exemplary embodiments will be described with reference to the accompanying drawings. Here, when a first element is described as being coupled to a second element, the first element may be not only directly coupled to the second element, but may also be indirectly coupled to the second element through one or more third elements. Further, elements that are not essential to a complete understanding of the disclosure are omitted for clarity. Also, like reference numerals refer to like elements throughout.

Figure 1A:
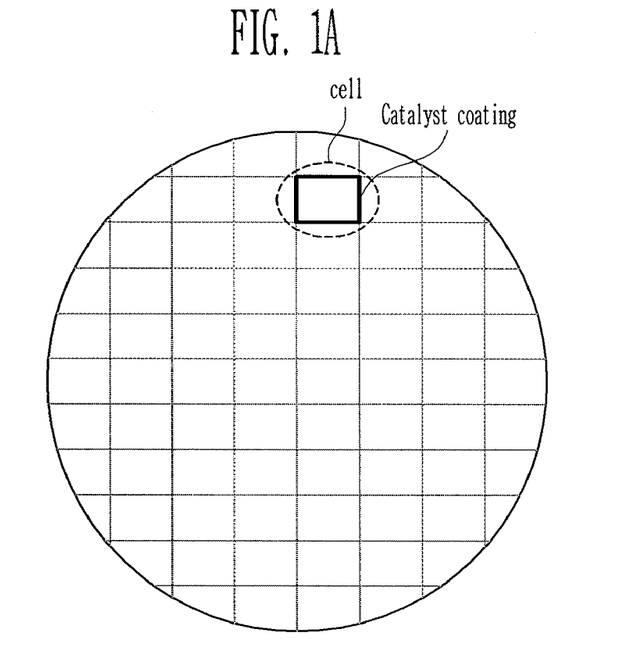
FIG. 1a is a view schematically showing an embodiment of a reaction vessel.

FIG. 1a shows a cross-sectional view of an embodiment of a reaction vessel using a metal monolithic reactor. The reaction vessel as shown in FIG. 1a has a cylindrical shape, and comprises a metal monolithic reactor comprising a plurality of longitudinal cells therethrough having a cell density of from about 200 cpi to about 1,500 cpi (cells per square inch); and a catalyst material, preferably, comprising metal particles, disposed on the walls of the longitudinal cell in the metal monolithic reactor.

The metal monolithic reactor may comprise any suitable metal, but is preferably an iron alloy or an aluminum alloy, which are relatively strong and inexpensive. In the illustrated embodiment, the metal monolithic reactor has a cross-sectional opening ratio of from about 40% to about 95%, which corresponds to a fill ratio of the walls is from about 5% to 60%). In some embodiments, at higher opening ratios, the reaction vessel becomes too weak and may become unstable at high temperatures, particularly when using inexpensive metals such as iron alloy or aluminum alloy. On the other hand, at lower opening ratios, gas flow is reduced, resulting in reduced reaction efficiency.

The metal monolithic reactor preferably has a cell density of from about 200 to about 1,500 cpi (cell per inch-square). In some embodiments, if the cell density of the metal monolithic reactor is less than about 200 cpi, reactivity is low due to the reduced amount of catalyst coated on the walls of the cells, while clogging of the reactants is observed in some embodiments with a cell density exceeding about 1,500 cpi.

The reaction vessel design shown in FIG. 1a is useful as a thermal oxidation reaction unit, a reforming reaction unit, a water gas shift unit, and/or a preferential oxidation unit, which together form an embodiment of a reforming device of a fuel cell system. If the reaction vessel is used as a steam reforming reaction unit, the catalyst comprises at least one of $Ni/Al_2O_3$, $Ru/ZrO_2$, $Ru/Al_2O_3$, $Ru/CeO_2$—$Al_2O_3$, and the like, as a major component.

If the reaction vessel is used as a thermal oxidation reaction unit, the catalyst comprises at least one of $PdAl_2O_3$, NiO, CuO, $CeO_2$, $Al_2O_3$, rhodium (Rh), palladium (Pd), platinum (Pt), and the like as a major component.

If the reaction vessel is used as a water gas shift unit, the catalyst comprises at least one of Cu, Zn, Fe, Cr, $Cr_2O_3/Fe_3O_4$, $Pt/CeO_2$, $Cu/ZnO/Al_2O_3$, and the like, as a major component.

If the reaction vessel is used as a preferential oxidation unit, the catalyst comprises at least one of Ru, Rh, $Pt/Al_2O_3$, $TiO_2$, $ZrO_2$, $Au/Fe_2O_3$, and the like, as a major component.

If the reaction vessel is used as an autothermal reforming reaction unit, the catalyst comprises at least one of Ru, Rh, Pt—$Rh/Al_2O_3$, $TiO_2$, $ZrO_2$, $CeO_2$, Ce—Zr composite, $Au/Fe_2O_3$, and the like, as a major component.

The reaction vessel as configured above has a monolithic shape with a catalyst disposed on the inner walls of the longitudinal cells, thereby increasing a contact area between the reaction gas and the catalyst. The metal walls rapidly heat the catalyst to a desired reaction temperature.

Figure 1B:
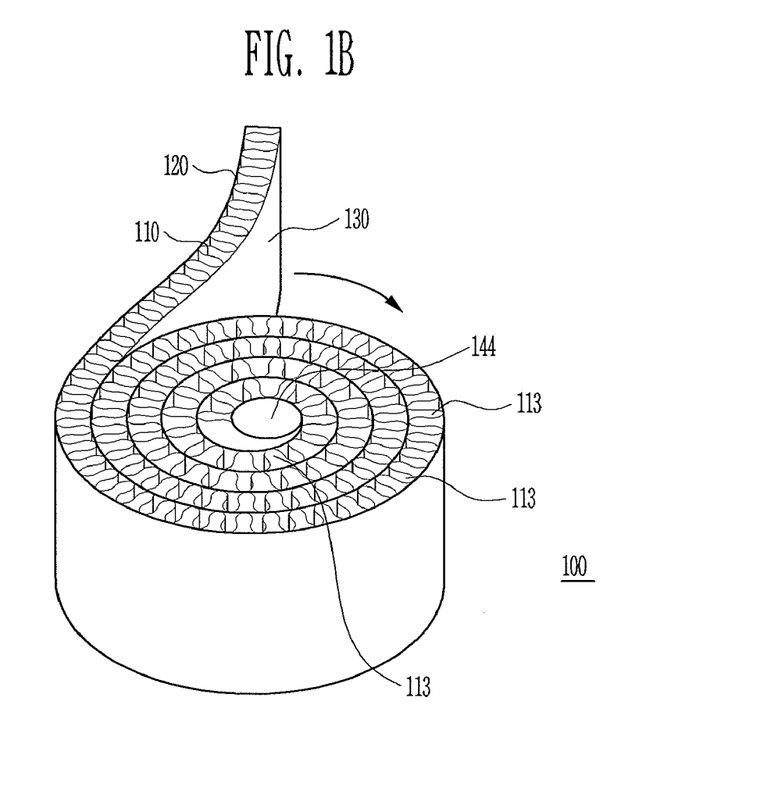
FIG. 1b is a perspective view showing an embodiment of a metal monolithic reaction vessel.

FIG. 1b shows an embodiment of a method for manufacturing a metal monolithic reactor having a spiral cross section. The metal monolithic reactor having a spiral cross section as shown in FIG. 1b comprises at least one spirally wound monolithic sheet, each sheet comprising a pleated substrate 110 having a plurality of generally uniform pleats formed therein, which form internal barriers between cells of the metal monolithic reactor; and at least one side substrate 120, 130 attached to one side or both sides of the pleated substrate 110. Here, a plurality of openings 113 are formed between the pleated substrate 110 and at least one side substrate 120, 130. And also, another opening 144 is formed on the center of the spiral cross section. According to another embodiment, the metal monolithic reactor may be formed in another manner, for example by folding at least one monolithic sheet in a zigzag manner.

In the case of the cylindrical reaction vessel, it is most economical and convenient to manufacture a metal monolithic reactor with a spirally wound monolithic sheet, as shown in FIG. 1b. Also, an improved reactivity is observed by modifying the pleated substrate 110 and/or side substrates 120, 130 that form the monolithic sheet, for example, by forming openings or perforations therethrough.

Figure 2A:
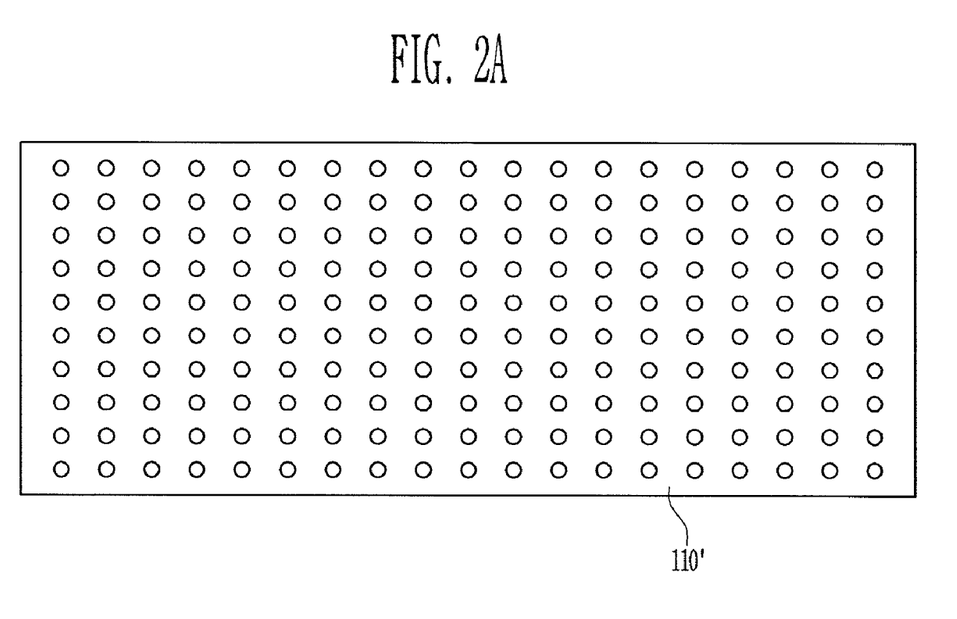
FIGS. 2a and 2b are a front view and a perspective view, respectively, showing a pleated substrate in another embodiment of a metal monolithic reaction vessel.
Figure 2B:
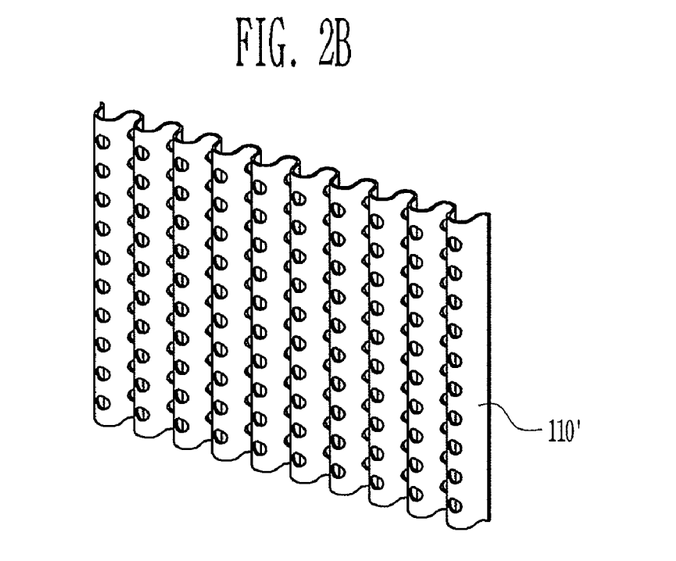

For example, a plurality of holes is formed in a substrate 110' before pleating, as shown in FIG. 2a. The substrate 110' after pleating is shown in FIG. 2b. Those skilled in the art will understand that an unpleated perforated substrate is also useful as one or both side substrates.

If gas flows uniformly through each of the cells in the metal monolithic reactor, no reaction occurs in a central region of the cell where the gas does not contact the cell wall. However, if the pleated substrate 110' as shown in FIG. 2b is used, a gas passing through each cell of the metal monolithic reactor may move into adjacent cells, thereby mixing the gas as the it moves between the cells, and contacting unreacted gas with the walls of the cells, resulting in enhanced catalyst reaction efficiency.

Figure 3A:
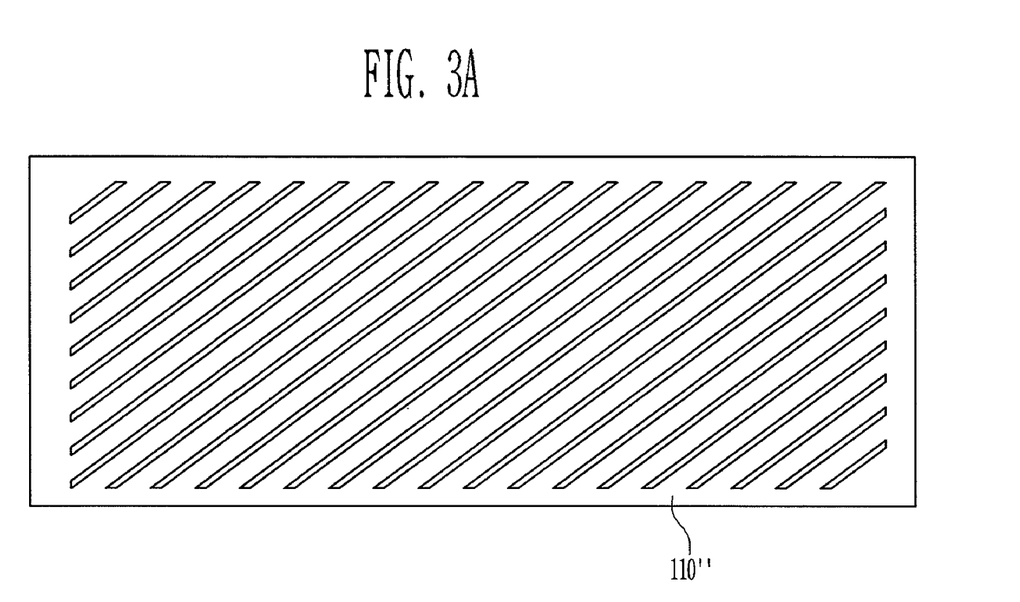
FIGS. 3a and 3b are a front view and a perspective view, respectively, showing a pleated substrate used in another embodiment of a metal monolithic reaction vessel.
Figure 3B:
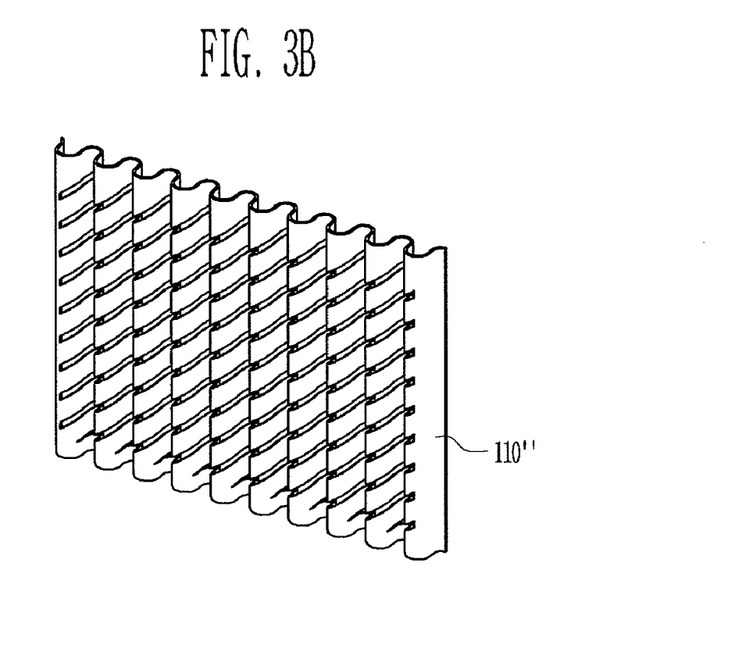

FIGS. 3a and 3b show a substrate 110'' perforated with a plurality of slots formed obliquely to an axis of the pleating, before and after pleating, respectively. The pleated substrate 110'' improves catalyst reaction efficiency by mixing gas as it passes between cells as discussed above in conjunction with the embodiments illustrated in FIGS. 2a and 2b.

As shown in FIGS. 3a and 3b, the openings are formed in the pleated substrate 110'' to form a gas-mixing structure, but openings may be formed in one or both of the side substrates according to another embodiment. The effects of perforating the side substrates on gas mixing are similar to those discussed above for the embodiment illustrated in FIGS. 2a and 2b.

Figure 4A:
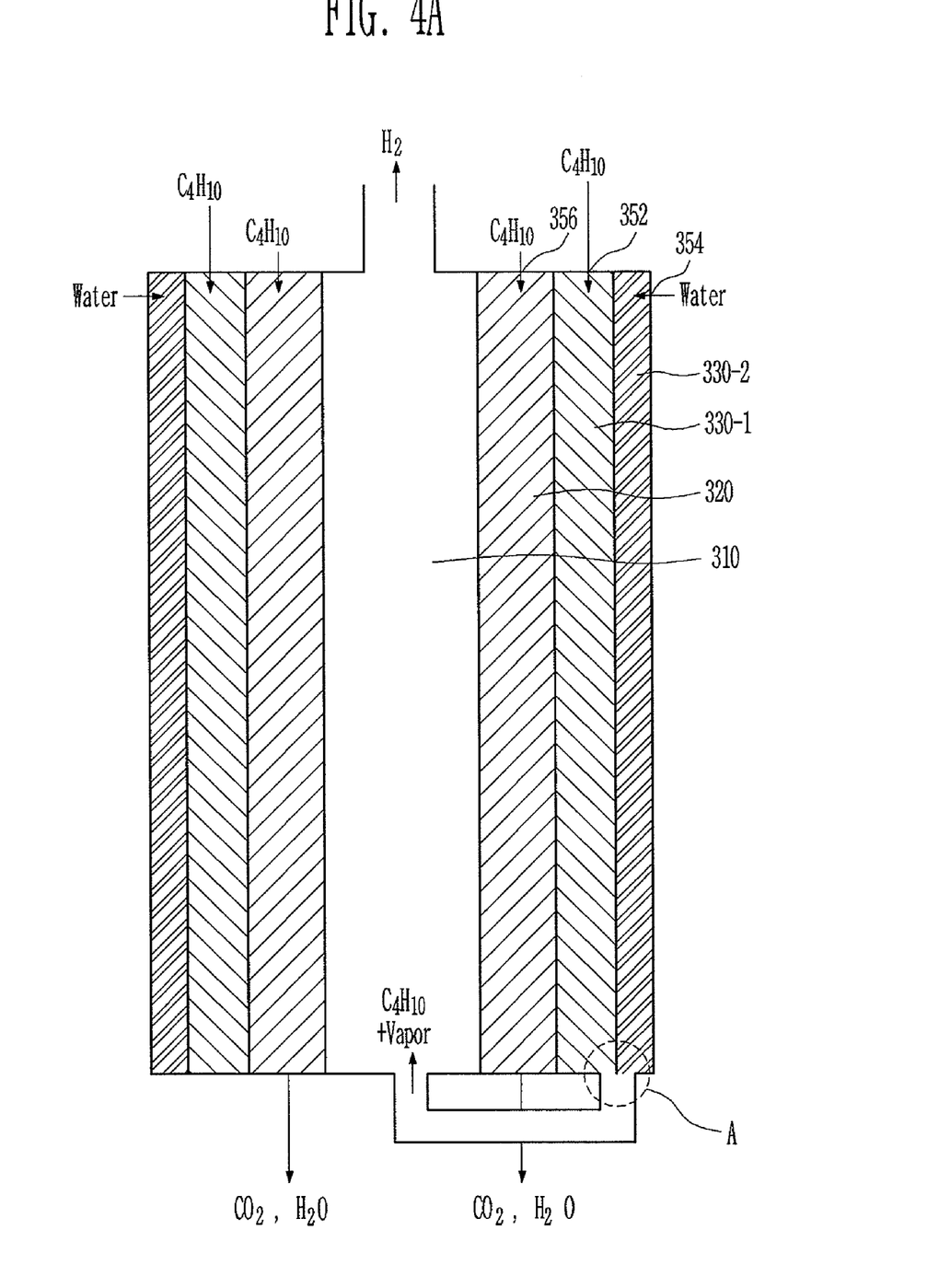
FIG. 4a is a longitudinal cross-sectional view showing an embodiment of a steam reforming reaction device.
Figure 4B:
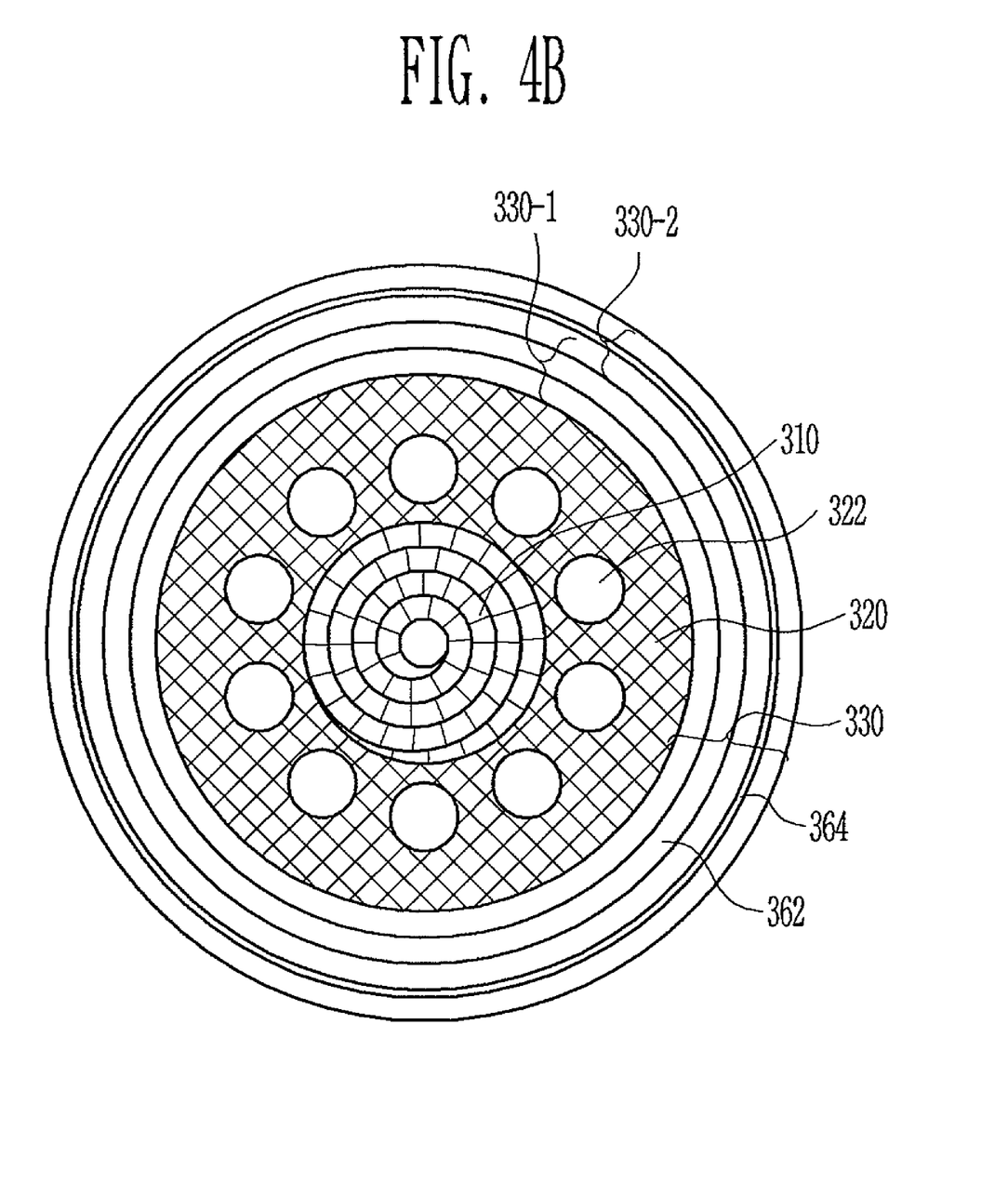
FIG. 4b is a lateral cross-sectional view showing an embodiment of a steam reforming reaction device.

FIGS. 4a and 4b show a steam reforming device 300 comprising the reaction vessel as shown in FIG. 1b. The operation of the steam reforming device 300 as shown in FIGS. 4a and 4b is illustrated using butane as an exemplary reformable fuel and an exothermic oxidation fuel. The steam reforming device 300 receives water and butane gas from an outside source, and catalytically oxidizes a portion of the butane gas to generate heat. The heat generated thus converts the water into steam. Butane gas is mixed with the steam and reformed to generate hydrogen gas. The steam reforming device 300 as viewed in cross section in FIG. 4b is formed in a generally cylindrical shape, and includes a steam reforming reaction catalyst chamber 310 comprising a spiral metal monolithic reaction vessel supporting a steam reforming reaction catalyst formed as a cylindrical core; and an arranged in a tube shape surrounding the steam reforming reaction catalyst chamber 310. An oxidation reaction of a combustible fuel occurs in the oxidation catalyst chamber 320, which supports an oxidation catalyst. According to the illustrated embodiment, the steam reforming device 300 may further include a plurality of electric heaters 322 disposed within the oxidation catalyst chamber 320 for heating the oxidation catalyst chamber 320 to a suitable temperature to induce an oxidation reaction.

A space 330 is maintained between the outside of the oxidation catalyst chamber 320 and an outer wall 370 of the steam reforming device. A fuel flow tube 362 and a water flow tube 364 are arranged as spiral or helical coils in the space 330, with a butane gas fuel flowing from a fuel inlet 352 into the fuel flow tube 362, and water flowing in from a water inlet 354 into the water flow tube 364. The water in the water flow tube 364 is converted into steam therein, and the butane gas is pre-heated before it is mixed with the steam.

That is to say, the space 330 between the outside of the oxidation catalyst chamber 320 and the outer wall 370 of the steam reforming device functions as a space 330-1 for pre-heating a fuel with the heat from the oxidation catalyst chamber 320; and a space 330-2 for pre-heating water. In some embodiments, a hot waste gas from the oxidation catalyst chamber 320 is directed into the space 330 to use the heat from the waste gas. According to the illustrated embodiment, at least one of the water and the butane gas is heated in the space 330.

The reaction catalyst chamber 310 comprises a metal monolithic reactor comprising a plurality of longitudinal cells, on the surfaces of which are disposed a catalyst for a steam reforming reaction. In some embodiments, the metal monolithic reactor preferably has a cell density of from about 200 cpi to about 1,500 cpi and an opening ratio of from about 40% to about 95%.

The reaction catalyst chamber 310 having the structure as described above is rapidly and uniformly heated by the oxidation catalyst chamber 320, with the heat supplied to circumferential walls of the reaction catalyst chamber 310. Therefore, all regions in which the butane gas is in contact with the catalyst are rapidly heated to a steam reforming reaction temperature.

The oxidation catalyst chamber 320 may also be formed in the same manner as in the reaction catalyst chamber 310 so that it can have a metal monolithic structure with the catalyst disposed thereon as shown in FIG. 1a. However, in some embodiments, it is more advantageous to retain the internally generated heat than to transfer the heat out rapidly, and therefore the oxidation catalyst chamber 320 is preferably formed of as a monolithic reactor of one or more ceramic materials comprising a plurality of longitudinal cells, wherein the catalyst for an oxidation reaction is disposed on a surface of the oxidation catalyst chamber 320.

A procedure of reforming a butane gas with a hydrogen gas in the steam reforming device as shown in FIGS. 4a and 4b will be described in detail.

A first portion of the butane gas is reformed into hydrogen gas, and a second portion of the butane gas is oxidized to supply sufficient heat to the steam reforming device for the steam reforming reaction to occur. A portion of the butane gas is mixed with air and the mixture flows into the oxidation catalyst chamber 320 through a gas inlet 356. The butane gas is oxidized in the oxidation catalyst chamber 320 to generate heat, water, and carbon dioxide.

The portion of butane gas to be reformed, enters a fuel inlet 352 into the fuel flow tube 362 that spirally encircles the oxidation catalyst chamber 320, where it is heated by the heat generated through the oxidation reaction in the oxidation catalyst chamber 320. Also, water enters a water inlet 354 into the water flow tube 364 that spirally encircles the oxidation catalyst chamber 320, where it is converted into steam by the heat generated through the oxidation reaction in the oxidation catalyst chamber 320.

The heated water is gasified in a discharge region (A) of a lower part of the steam reforming device to generate steam. The heated butane gas is supplied to another region of the lower part of the steam reforming device. The steam and the heated butane gas are mixed in a core region of the lower part of the steam reforming device and the mixture flows into a reaction catalyst chamber 310 for steam reforming.

The steam and butane gas flow into the reaction catalyst chamber 310 through the metal monolithic reactor that fills the interior of the reaction catalyst chamber 310, where it is reformed into hydrogen gas by the aid of the catalyst disposed on a surface of the metal monolithic reactor, as shown in Scheme 1. In the illustrated embodiment, the oxidation catalyst chamber 320 surrounding the reaction catalyst chamber 310 generates a sufficient heat through the oxidation reaction to provide a suitable temperature for the steam reforming reaction.

In other embodiments, the reaction device is used for the reforming reaction unit, the water gas shift unit, and/or the preferential oxidation unit, all of which are used in a conventional reformer. However, the embodiment described herein uses the reaction device is as a reforming reaction unit, which is generally the most difficult application because it uses the highest reaction temperature. Accordingly, those skilled in the art will understand that other embodiments of the reaction device may be applied to the other reaction portions of the reformer, the operations of which fall into the attainable temperature ranges of the reactor design.

Described herein are exemplary examples provided for the purpose of illustration only, and are not intended to limit the scope of the disclosure. Those skilled in the art will understand that changes and modifications, and their equivalents could be made without departing from the spirit and scope thereof, which is defined in the claims and their equivalents.

What is claimed is:

1. A reaction device, comprising:
a cylindrical reaction catalyst chamber comprising a metal monolithic reactor on which is disposed a target reaction catalyst for a target reaction;
a tubular oxidation catalyst chamber surrounding the reaction catalyst chamber, wherein the oxidation catalyst chamber comprises an oxidation reaction catalyst for the oxidation of a combustible fuel therein;
a fuel preheating unit comprising a tube circumferentially surrounding the oxidation catalyst chamber, configured for pre-heating a fuel with a heat from the oxidation catalyst chamber;
wherein the reaction device is configured for reforming a hydrocarbon fuel with hydrogen gas.

2. The reaction device according to claim 1, further comprising a water preheating unit comprising a tube shape circumferentially surrounding the oxidation fuel preheating unit, configured for pre-heating water with heat from the oxidation catalyst chamber.

3. The reaction device according to claim 1, further comprising an electric heater disposed in the oxidation catalyst chamber, configured for heating the oxidation catalyst chamber to a suitable temperature to induce an oxidation reaction.

4. The reaction device according to claim 1, wherein the oxidation catalyst chamber comprises a metal monolithic reactor with the oxidation reaction catalyst disposed thereon.

5. The reaction device according to claim 1, wherein the oxidation catalyst chamber comprises a ceramic monolithic reactor with the oxidation reaction catalyst disposed thereon.

6. The reaction device according to claim 4, wherein the oxidation reaction catalyst comprises at least one of $PdAl_2O_3$, NiO, CuO, $CeO_2$, $Al_2O_3$, Rh, Pd, and Pt.

7. The reaction device according to claim 1, wherein the target reaction is a steam reforming reaction, and the target reaction catalyst comprises at least one of $Ni/Al_2O_3$, $Ru/ZrO_2$, $Ru/Al_2O_3$, and $Ru/CeO_2$-$Al_2O_3$.

8. The reaction device according to claim 1, wherein the target reaction is a water gas shift reaction, and the target reaction catalyst is at least one of Cu, Zn, Fe, Cr, $Cr_2O_3$/$Fe_3O_4$, $Pt/CeO_2$, and $Cu/ZnO/Al_2O_3$.

9. The reaction device according to claim 1, wherein the target reaction is a selective oxidation reaction, and the target reaction catalyst material comprises at least one of Ru, Rh, $Pt/Al_2O_3$, $TiO_2$, $ZrO_2$, and $Au/Fe_2O_3$.

10. A reaction device, comprising:
a cylindrical reaction catalyst chamber comprising a metal monolithic reactor on which is disposed a target reaction catalyst for a target reaction, the metal monolithic reactor comprising:
a plurality of longitudinal cells with an opening ratio of from about 40% to about 95%, as measured in a cross-sectional surface orthogonal to the longitudinal direction,
a plurality of stacked spirally wound monolithic sheets, each of which comprises a pleated substrate having a plurality of uniform pleats formed therein and forming an internal barrier between cells, and
a side substrate attached to one or both sides of the pleated substrate,
wherein the pleated substrate or the side substrate has a plurality of holes;
a tubular oxidation catalyst chamber surrounding the reaction catalyst chamber, wherein the oxidation catalyst chamber comprises an oxidation reaction catalyst for the oxidation of a combustible fuel therein;
a fuel preheating unit comprising a tube circumferentially surrounding the oxidation catalyst chamber, configured for pre-heating a fuel with a heat from the oxidation catalyst chamber; and
a water preheating unit comprising a tube shape circumferentially surrounding the oxidation fuel preheating unit, configured for pre-heating water with heat from the oxidation catalyst chamber.

* * * * *